Jan. 3, 1956  J. C. MARRONE  2,729,561
BLOWING DRY STARCH INTO A PAPERMAKING FURNISH
Filed Aug. 26, 1952
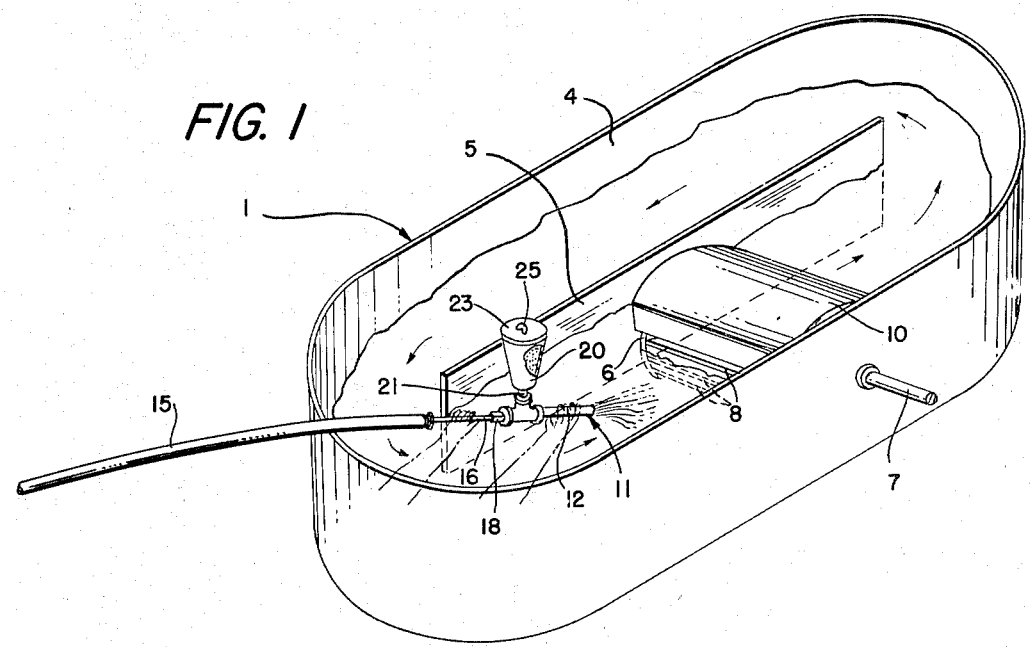
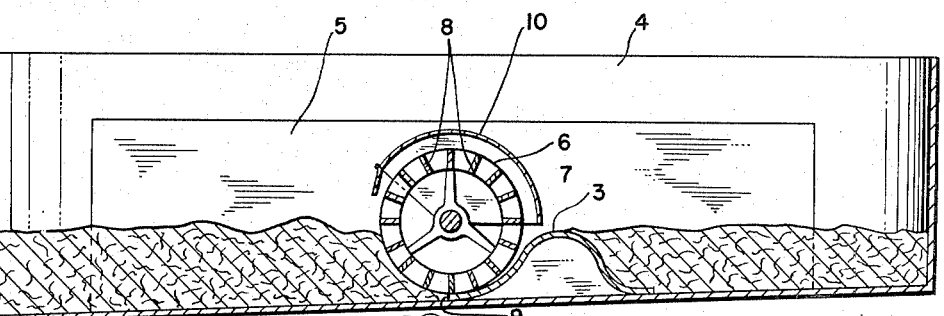
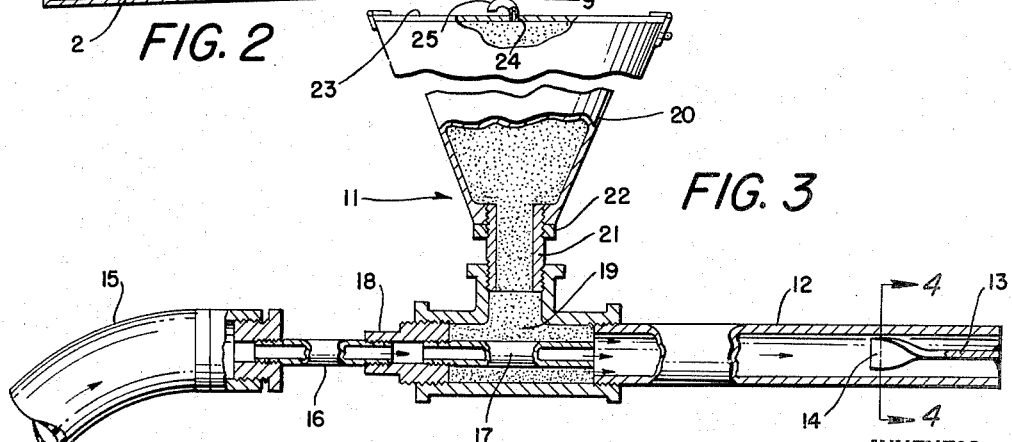
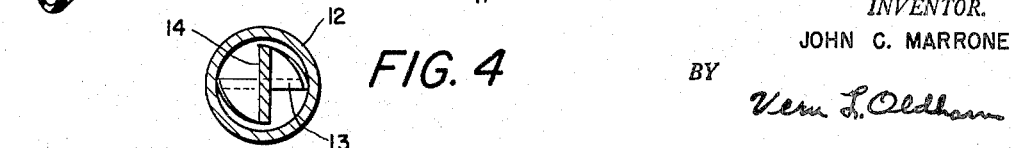
INVENTOR.
JOHN C. MARRONE
BY Vern L. Oldham
ATTORNEYS United States Patent Office 2,729,561
Patented Jan. 3, 1956

2,729,561

BLOWING DRY STARCH INTO A PAPERMAKING FURNISH

John C. Marrone, Woodbury, Conn.

Application August 26, 1952, Serial No. 306,396

2 Claims. (Cl. 92—21)

This invention relates to methods of and devices for distributing particulate materials, such as starch, into other materials, such as an aqueous paper pulp mixture used in making paper.

The invention relates especially to the distribution of particles of starch in water, particularly where such starch particles have the property of absorbing water practically instantaneously with attendant swelling and becoming congealed or gelatinous immediately upon contact with water. This starch can be made in various particle sizes and usually it is preferred to make it as minute as possible. The particles readily form an undesirable gelatinous mass when a quantity of dry starch is mixed into an aqueous solution, when initially placed in contact therewith, if great care is not observed in the mixing process. Heretofore, it has been very difficult to disperse quantities of dry starch particles properly in a paper mixture or batch, particularly if such starch particles were of the cold swelling type, as they frequently congealed in small masses in the mixture and remained intact in the mixture to form weak spots in the paper made therefrom.

Heretofore it even has been necessary in many instances to form a water solution of dry materials, such as starch, before adding then to an aqueous paper mixture. Such action obviously required special mixing apparatus and additional operations that would be undesirable in the manufacture of paper in commercial practice.

While the use of starch in paper manufacture is very desirable as a stiffener or body reinforcement for the paper, it has not been used as frequently as might be expected, particularly if less difficulty was encountered in mixing the starch satisfactorily with the remaining components of a paper batch or mix.

Accordingly, it is the general object of the present invention to provide a new and improved apparatus of and method for distributing small dry particles into aqueous mixtures, such as are used in the manufacture of paper.

Another object of the invention is to provide a portable apparatus for use in air blasting starch particles into an aqueous paper mix.

Another object of the invention is to provide a method of adding materials, such as starch, quickly and conveniently to a paper batch, while such batch is being processed otherwise in accordance with conventional practice.

Still another object of the invention is to provide an apparatus for receiving a conventional quantity of starch and depositing it by a turbulent air stream into the remaining components of a paper batch.

Yet another object of the invention is to utilize a gravity and a suction action in drawing starch particles from a hopper, picking up such particles in an air stream and depositing them in the paper mixture.

The foregoing and other objects and advantages of the invention will be made more apparent as the specification proceeds.

The accompanying drawing shows one currently preferred embodiment of the apparatus for practicing the principles of the invention, and wherein:

Fig. 1 is a perspective view of a pulp beater used in paper making with the apparatus of the invention associated therewith and showing the method of the invention;

Fig. 2 is a longitudinal vertical section of the pulp beater of Fig. 1;

Fig. 3 is an enlarged longitudinal vertical section through the blower or spray apparatus of the invention, with a portion of the apparatus cut away; and Fig. 4 is a vertical cross section taken on line 4—4 of Fig. 3.

The present invention, broadly speaking, resides in the air blasting of starch particles by a turbulent air stream into an agitated aqueous paper mixture being processed by conventional paper making apparatus, such as a pulp beater. The spray apparatus of the invention includes a spray nozzle preferably having baffle means therein, means for connecting an air supply to such spray nozzle, a material receiving and storage chamber into which such air supply means discharge, the spray nozzle being connected to the discharge end of such material receiving and storage chamber, and a hopper connected to such material receiving and storage chamber for gravity deposit of material into the chamber whereby the discharged air will pick up, by suction particles of such material and carry the particles through the discharge nozzle as air is blasted therefrom.

Reference now should be made to the details of the structure shown in the drawings, and Fig. 1 indicates a pulp beater which is indicated as a whole by the numeral 1. This pulp beater is of conventional construction and includes an inclined floor 2 which has a dam 3 therein and an enclosure wall 4 extending around the pulp beater. A partition 5 is positioned within the pulp beater 1 to form a continuous oval path therein for flow of material around the pulp beater as the material therein is suitably agitated. A driven agitator drum 6 is positioned in the pulp beater 1 and it has a shaft 7 extending therefrom for connection to conventional driving means (not shown). The agitator drum 6 includes a plurality of cutter knives 8 that extend transversely of the drum and which pass closely adjacent a back-up or cutter plate 9, positioned within the pulp beater 1 adjacent the bottom of the agitator drum 6. A suitable hood 10 is placed over the top portion of the agitator drum 6. Thus, when the drum 6 is driven in the manner indicated, it will cause turbulence in the material received in the pulp beater. Such material normally comprises a large volume of water in which paper pulp and any other desired materials are present. The agitator drum 6 causes a flow of materials around the continuous circuit provided in the pulp beater and the pulp is cut into small particles as the drum 6 forces such pulp between the knives 8 and the plate 9. The height of the dam 3, it will be realized, controls the height of the materials in the pulp beater 1 adjacent the entrance side of the agitator drum 6.

The improved particle spraying apparatus of the invention is indicated as a whole by the numeral 11 and it includes a spray or discharge nozzle 12 that has a baffle 13 suitably positioned therein at the exit end of such nozzle. Figs. 3 and 4 show that the baffle 13 is twisted through 90° around its longitudinal axis at the inner end 14 thereof and this aids in providing a turbulence in the air or other gas flowing through the spray nozzle 12. The spray nozzle is designed to receive compressed air, or other suitable conveying gas, from a supply line 15 connected through suitable fittings 16 to a smaller diameter air tube 17 that terminates adjacent the inner end of the spray nozzle 12. Such air supply tube usually is positioned by a fitting 18 which engages a material receiving and discharge chamber forming member 19 which in this instance is shown as comprising a conventional T fitting as is used in the plumbing and associated trades. The inner end of the nozzle 12 connects to the member 19 in axial alignment with the fitting 18 but at the opposite end of the member 19.

In order to supply the material to be sprayed to the nozzle 12, a suitable hopper 20 is provided in the apparatus and it may be connected to the member 19 by a connector tube 21 whereby the hopper 20 is fixedly secured in position with relation to the member 19. A lock nut 22 aids in holding the hopper 20 in position or the hopper may be brazed to the tube 21. This hopper 20 preferably has a cover 23 hinged or otherwise removably secured thereto at its top so that foreign objects cannot fall into the hopper. Also the cover 23 may have one or more holes 24 therein with an inverted J-shaped tube 25 secured therein so that air but not water may pass through this hole. Or, a fine mesh screen may be secured over the hole 24 for the same purpose.

Thus, in operation, the hopper 20 will have a desired amount of material, such as cold swelling starch, positioned therein, after which a workman whose arms are indicated at W may manually take the spray apparatus 11 and spray the desired quantity of dry material into the bath of material in the pulp beater 1. If desired, the operator may have a suitable valve (not shown) provided in the spray line 15 or other part of the apparatus to control flow of air through the apparatus of the invention.

In testing apparatus such as disclosed herein, it has been found that the apparatus provides an effectively dispersed stream of particles in the air blown from the spray nozzle 12. Such particles therefore individually contact the water in the paper batch to be individually and immediately picked up or mixed into such batch. This prevents any possible conglomeration of the starch particles and avoids the formation of weak zones in paper formed from the material present in the pulp beater.

By use of the invention, it is possible to use starch of finer particle size than has been conventionally used heretofore. Starch heretofore has been ground to pass through a 30 mesh screen whereas now a finer grind of starch, such as could pass through a 70 to 90 mesh screen, may be used and still have a rapid and satisfactory dispersion of such particles in a paper mix.

It also may be possible to put a control nozzle or choke such as are used on shotguns on the end of the spray nozzle 12 to aid in controlling the spread of material from such nozzle. A nozzle which has an elongate horizontal shape may be used in the spray apparatus, if desired.

The spray apparatus may be used with other conventional paper making processes or apparatus and could be used to add materials to a paper mix when the materials are in a hydro-pulper, or in a blending chest. Also the stream of dry particles could be blown into a paper batch before or after it has passed through a Jordaning mill, or it may be possible to introduce the particles directly into a Jordan mill by practice of the invention.

It will be realized that dry gas must be used as a conveyor for the particles discharged since any moisture contact therewith is completely objectionable.

In some instances, it may be desired to agitate the hopper 20 to aid in having the materials flow freely therefrom and conventional means may be used for such function. Furthermore, in some instances, it may be desired to permit the baffle 13 to rotate as by securing a narrow crossbar in the nozzle 12 at the discharge end thereof and journaling the baffle on its longitudinal axis on such cross bar.

The apparatus of the invention may, in some instances, be used with any kind of starch such as drum dried starch, powdered starch, gelatinized starch; with clays, titanium compounds, calcium sulphate or other powdered materials used in paper making. Usually the materials forming the spray apparatus 11 may be made from aluminum, cast iron or brass, as such materials appear to be particularly inert with relation to starch. The apparatus may be fixed in one position, if desired.

The air pressure used in practice of the method of the invention normally would be about 100 pounds to the square inch as this effects a desired conveying action and is usually available in most factories. By spraying the particles of material into the mixture in the pulp beater 1 downwardly toward the aqueous batch therein, a minimum amount of material is lost by the air stream carrying the particles away from or past the pulp beater 1 and materials therein.

It is an important feature of the invention that the tube 17 extends past the gravity feed conductor tube 21 to the nozzle 12, and that a limited amount of material can flow around the tube 17 to be sucked up by the air stream discharging from the tube 17. Also, the more turbulence in the paper mixture as the starch is added, the faster the material can be blown therein.

From the foregoing, it will be realized that the invention provides a method and apparatus by which reasonable quantities of dry powder-like materials can be rapidly added to aqueous mixtures. The apparatus provides fine particles individually presented for dispersion into an aqueous mixture and will prevent massing of particles in such mixture so that the objects of the invention are thought to be achieved.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. A method of depositing starch particles or the like into an aqueous paper pulp mixture comprising the steps of moving a paper pulp mixture through a controlled closed circuit path, continuously agitating such paper pulp mixture as it is moved, providing an air stream, moving starch particles into the air stream by gravity and suction action, creating a turbulence in the starch carrying air stream, and discharging the starch carrying air stream onto the moving surface of the paper pulp mixture at a localized area thereof for ready inclusion into such aqueous paper pulp mixture.

2. A method of depositing starch particles or the like into an aqueous paper pulp mixture comprising the steps of moving a paper pulp mixture through a controlled closed circuit path, continuously agitating such paper pulp mixture as it is moved, providing an air stream, moving starch particles into the air stream by gravity and suction action, and discharging the starch carrying air stream onto the moving surface of the paper pulp mixture at a localized area thereof for ready inclusion into such aqueous paper pulp mixture.

References Cited in the file of this patent

UNITED STATES PATENTS

| | | |
|---|---|---|
| 185,592 | Stevenson | Dec. 19, 1876 |
| 1,058,431 | Hilliard | Apr. 8, 1913 |
| 1,153,132 | Pettit | Sept. 7, 1915 |
| 1,486,883 | Halliburton | Mar. 18, 1924 |
| 1,556,252 | Shepherd | Oct. 6, 1925 |
| 1,755,329 | McCormack | Apr. 22, 1930 |
| 1,919,697 | Groff | July 25, 1933 |
| 2,337,459 | Edson | Dec. 21, 1943 |
| 2,344,703 | Kemper | Mar. 21, 1944 |
| 2,570,004 | Penny | Oct. 2, 1951 |
| 2,653,801 | Fontein et al. | Sept. 29, 1953 |
| 2,660,560 | Pickard | Nov. 24, 1953 |